United States Patent [19]

Okayama

[11] 4,432,047
[45] Feb. 14, 1984

[54] SEQUENCE CONTROL APPARATUS

[75] Inventor: Yoshihiko Okayama, Numazu, Japan

[73] Assignee: Toshiba Kikai Kabushiki Kaisha, Tokyo, Japan

[21] Appl. No.: 262,978

[22] Filed: May 12, 1981

[30] Foreign Application Priority Data

May 16, 1980 [JP] Japan .................................. 55-65002

[51] Int. Cl.³ .......................................... G06F 15/46
[52] U.S. Cl. ..................................... 364/147; 364/900; 364/140
[58] Field of Search ............... 364/136, 140, 141, 146, 364/147, 200 MS File, 900 MS File

[56] References Cited

U.S. PATENT DOCUMENTS

| 4,025,902 | 5/1977 | Nakao et al. | 364/147 |
| 4,217,658 | 8/1980 | Henry et al. | 364/147 |
| 4,227,247 | 10/1980 | Kintner | 364/147 |
| 4,244,034 | 1/1981 | Cherba | 364/147 |
| 4,247,909 | 1/1981 | Bradley et al. | 364/147 |
| 4,253,141 | 2/1981 | Suzuki et al. | 364/147 |

Primary Examiner—Jerry Smith
Assistant Examiner—William G. Niessen
Attorney, Agent, or Firm—Koda and Androlia

[57] ABSTRACT

A programmable sequence control apparatus comprises a memory device for storing sequence program instructions, an input/output device for introducing input data and delivering output data therefrom, a ladder operation device for carrying out logic operations for a ladder circuit having n lines and m columns in accordance with said program instructions, and a control device for delivering control signals to the ladder operation device. The ladder operation device comprises a first memory device for storing contact data for each column of said ladder circuit, a second memory device for storing branch data for each column of said ladder circuit, and a gate device for executing logic operations for respective lines in each column based on the results of the logic operations executed for corresponding lines in a previous column, and on outputs from the first and second memory devices for delivering results of the operations for the logic operations of a subsequent column.

1 Claim, 19 Drawing Figures

| NO. | BIT 2 3 4 5 6 | FUNCTION |
|---|---|---|
| 0 | 0 0 0 0 0 | A CONTACT FOR GENERAL INPUTS |
| 1 | 0 0 0 0 1 | A CONTACT FOR COUNTER AND TIMER INPUTS |
| 2 | 0 0 0 1 0 | A CONTACT FOR LATCH AND DUMMY INPUTS |
| 3 | 0 0 0 1 1 | UNCONDITIONALY OFF |
| 4 | 0 0 1 0 0 | B CONTACT FOR GENERAL INPUTS |
| 5 | 0 0 1 0 1 | B CONTACT FOR COUNTER AND TIMER INPUTS |
| 6 | 0 0 1 1 0 | B CONTACT FOR LATCH AND DUMMY INPUTS |
| 7 | 0 0 1 1 1 | UNCONDITIONALY ON |
| 8 | 0 1 0 0 0 | ÷ |
| 9 | 0 1 0 0 1 | × |
| 10 | 0 1 0 1 0 | − |
| 11 | 0 1 0 1 1 | + |
| 12 | 0 1 1 0 0 | → (MOVE) |
| 13 | 0 1 1 0 1 | > |
| 14 | 0 1 1 1 0 | < |
| 15 | 0 1 1 1 1 | = |
| 16 | 1 0 0 0 0 | GENERAL OUTPUT (I/O) |
| 17 | 1 0 0 0 1 | TIMER OUTPUT (TON) |
| 18 | 1 0 0 1 0 | INTEGRATED TIMER OUTPUT (RTO) |
| 19 | 1 0 0 1 1 | UP COUNTER OUTPUT (CTU) |
| 20 | 1 0 1 0 0 | DOWN COUNTER OUTPUT (CTD) |
| 21 | 1 0 1 0 1 | LATCH OUTPUT (L) |
| 22 | 1 0 1 1 0 | DUMMY OUTPUT (R) |
| 23 | 1 0 1 1 1 | ADDITIONAL FUNCTION (BY USER) |
| 24 | 1 1 0 0 0 | ADDITIONAL FUNCTION (BY USER) |
| 25 | 1 1 0 0 1 | ADDITIONAL FUNCTION (BY USER) |
| 26 | 1 1 0 1 0 | INTEGRATED TIMER RESET OUTPUT (↓) |
| 27 | 1 1 0 1 1 | UP COUNTER RESET (↓) |
| 28 | 1 1 1 0 0 | DOWN COUNTER RESET OUTPUT (↓) |
| 29 | 1 1 1 0 1 | UNLATCH OUTPUT (↓) |
| 30 | 1 1 1 1 0 | NOP |
| 31 | 1 1 1 1 1 | CONSTANT (K) |

NOTE : A REPRESENTS NORMALLY-OPENED CONTACT
B REPRESENTS NORMALLY-CLOSED CONTACT

FIG. 7

| SYMBOL | CONTENTS | SYMBOL | CONTENTS |
|---|---|---|---|
|  | CONTACT UNCONDITIONALLY OFF WITH NO BRANCH CONNECTION |  | CONTACT UNCONDITIONALLY ON WITH NO BRANCH CONNECTION |
|  | CONTACT UNCONDITIONALLY OFF WITH BRANCH CONNECTION |  | CONTACT UNCONDITIONALLY ON WITH BRANCH CONNECTION |
|  | NORMALLY OPENED CONTACT WITH NO BRANCH CONNECTION |  | NO OUTPUT WITH BRANCH CONNECTION |
|  | NORMALLY OPENED CONTACT WITH BRANCH CONNECTION |  | OUTPUT WITH NO BRANCH CONNECTION (ONE CIRCUIT END) |
|  | NORMALLY CLOSED CONTACT WITH NO BRANCH CONNECTION |  | OUTPUT WITH BRANCH CONNECTION |
|  | NORMALLY CLOSED CONTACT WITH BRANCH CONNECTION | ( )+( )=( )<br>( )÷( )=( )<br>( )x( )=( )<br>( )-( )=( )<br>( )→( )<br>( )>( )<br>( )<( )<br>( )=( ) | ARITHMETIC OPERATION |

| CONVENTIONAL METHOD | | METHOD OF THE INVENTION | |
|---|---|---|---|
| SET | X1 | | X1 |
| SET | X2 | END | |
| AND | X3 | | X2 |
| OR | X4 | | X4 |
| SET | X5 | END | X5 |
| AND | X6 | | X3 |
| OR SET | | END | |
| AND SET | | | X6 |
| OUT | Y12 | END | Y12 |

SEQUENCE CONTROL APPARATUS

BACKGROUND OF THE INVENTION

This invention relates to programmable sequence control apparatus, and more particularly to a type thereof utilizing a novel circuit operable as a relay ladder circuit.

Control apparatus including complicated relay systems known as relay ladder circuits have been widely known. In these apparatus when one part of the relay ladder circuit is desired to be altered, various parts associated therewith must be also altered thereby rendering the alteration to be extremely troublesome.

In order to eliminate the above described difficulties, programmable sequence control apparatus have been heretofore developed. In this kind of control apparatus, the relay ladder circuit in the form of hardware is not utilized any more, but a sequence control program is stored therein in the form of software.

The control methods used in recent programmable sequence controllers can be classified into two groups, one being a method for controlling the sequence of operation in accordance with Boolean formula of the Polish notation, and the other being a method for controlling each relay sequence by a jumping instruction as disclosed in the Japanese Laid-Open Patent Specification No. 152174/1975.

Figure 1:
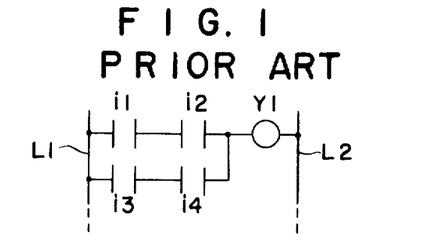
FIGS. 1 and 2 are examples of well known relay ladder circuits.

The methods will now be described in detail with respect to a relay circuit shown in FIG. 1.

According to the first method utilizing Boolean formulae, a program for obtaining the logic sum Y1 of two values, one being a logic product of the contacts i1 and i2, and the other being a logic product of the contacts i3 and i4, includes the following instructions.

(1) Load an accumulator with i1,
(2) Calculate logic product of i2 and the contents of the accumulator,
(3) Shift the logical product obtained by the accumulator into a memory device,
(4) Load the accumulator with i3,
(5) Calculate a logic product between the contents of the accumulator and i4,
(6) Calculate logic sum of the logic product stored in the memory device and the contents of the accumulator, and
(7) Deliver the logic sum to the output Y1.

On the other hand, a program used in the second method utilizing jumping instructions includes the following instructions.

(1) Load an accumulator with i1,
(2) Calculate logic product of i2 and the content of the accumulator,
(3) Jump to the following step (9) if the logic product satisfies a condition (ON),
(4) Load the accumulator with i3,
(5) Calculate logic product of i4 and the contents of the accumulator,
(6) Jump to step (9) if the logic product satisfies a condition (ON),
(7) Stop the output (when the condition is not satisfied),
(8) Jump to step (10) without any condition,
(9) Produce the output, and
(10) Shift operation to another relay ladder circuit.

As is apparent from the above description, the programs used in the two methods must be prepared by carefully observing the relay ladder circuit and considering the sequence in executing the instructions. This means that the preparation, compiling, and correction of the programs are complicated in accordance with the complexity of the relay ladder circuit.

SUMMARY OF THE INVENTION

The object of the present invention is to provide a sequence control apparatus including a novel operational portion which utilizes a novel concept of a switch matrix for the preparation of a program concerning a relay ladder circuit.

According to the invention, there is provided a sequence control apparatus comprising a memory device for storing sequence program instructions, an input/output device for introducing input data and delivering output data therefrom, a ladder operation device for carrying out logic operations for a ladder circuit having n rows and m columns in accordance with said program instructions, and a control device for delivering control signals to the ladder operation device, said ladder operation device comprising a first memory device for storing contact data for each column of said ladder circuit, a second memory device for storing branch data for each column of said ladder circuit, and a gate device for executing logic operations for respective rows in each column based on the results of the logic operations executed for corresponding rows in a previous column, and on outputs from the first and second memory devices, and for delivering results of the operations for the logic operations of a subsequent column, so that the ladder operation device is operable in response to control signals delivered from the control device to execute logic operations successively starting from the first column to the last column of the ladder circuit.

The invention will now be described in more detail with reference to the accompanying drawings.

BRIEF DESCRIPTION OF THE DRAWINGS

In the accompanying drawings:

FIG. 8b is a comparison table of conventional programming process and that of the present invention to be used for the relay ladder circuit shown in FIG. 8a;

DESCRIPTION OF THE PREFERRED EMBODIMENT

A basic principal of the present invention will firstly be described.

Figure 2:
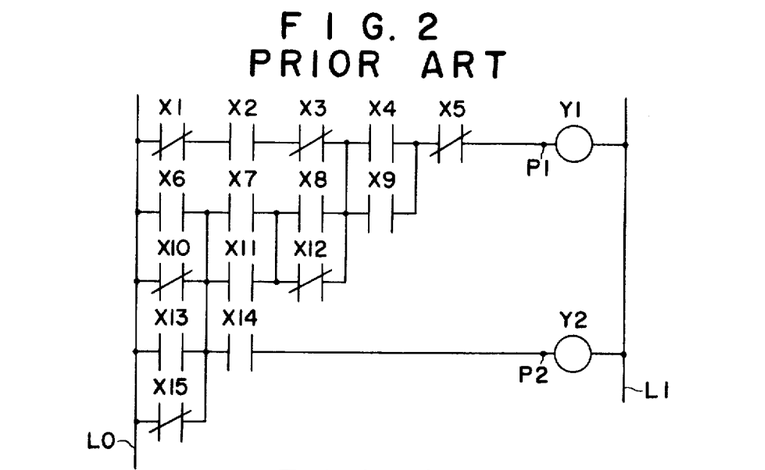

FIG. 2 shows an example of a relay ladder circuit. In this circuit, $X_1$ through $X_{15}$ designate relay contacts (normally open or normally closed), and $Y_1$ and $Y_2$ designate output elements which are energized when the potentials at positions $P_1$ and $P_2$ are made to be equal to the potential of a line $L_o$.

Figure 3:
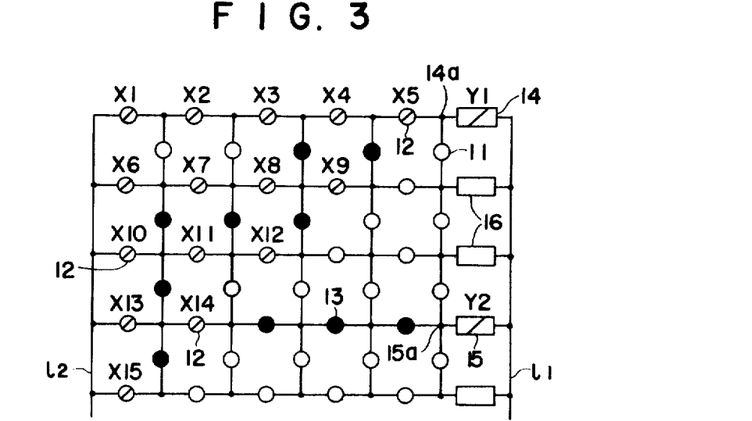
FIG. 3 is a switch matrix corresponding to the ladder circuit shown in FIG. 2.

In FIG. 3 there is indicated a network in the form of a matrix which simulates the relay ladder circuit shown in FIG. 2. In the latter figure, blank circles 11 represent switches always held in OFF states, slashed circles 12 represent switches corresponding to relay contacts, and black circles 13 represent switches always held in ON states.

Likewise, slashed rectangles 14 and 15 represent detectors corresponding to the output elements $Y_1$ and $Y_2$ respectively, and blank rectangles 16 represent detectors always held in OFF states. The detectors represented by the slashed circles 14 and 15 are in ON states when the potentials of positions $14_a$ and $15_a$ are brought to the potential of a power line $l_o$.

Comparing FIG. 2 with FIG. 3, it is apparent that a practical relay ladder circuit shown in FIG. 2 can be represented by a matrix-form network shown in FIG. 3 having switches as described above at positions corresponding to those of the matrix elements.

Thus, by considering a switch network of a matrix form (hereinafter termed switch matrix) wherein switches are arranged in a two-dimensional form as shown in FIG. 3, the above described complicated procedures in providing sequence programs for the relay ladder circuit of FIG. 2 can be eliminated entirely. More specifically, the condition of the output elements $Y_1$ and $Y_2$ can be determined by the use of ON-OFF data for the contacts which are represented by slashed circles 12 in the switch matrix as shown in FIG. 3. Since the logical operation of the switch matrix in this invention is executed by a logic operation circuit in the form of hardware, the aforementioned repeated execution of numerous instructions in the conventional procedures becomes utterly unnecessary.

FIGS. 4a through 4d are diagrams useful to explain the logic operation of this invention.

Figure 4A:
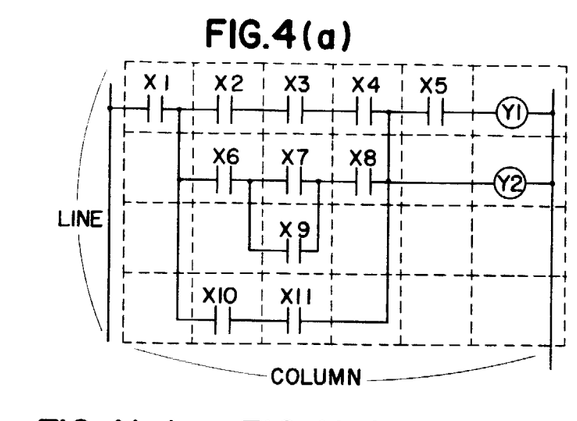
FIG. 4a is a diagram wherein a relay ladder circuit is divided into matrix elements.
Figure 4B:
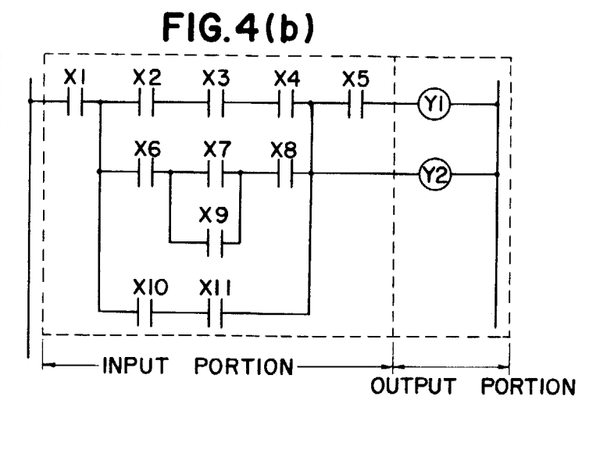
FIG. 4b is a diagram wherein the switch matrix shown in FIG. 4a is divided into an input portion and an output portion.
Figures 4C, 4D:
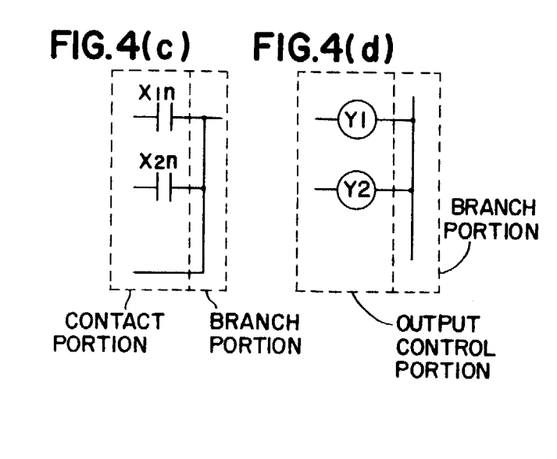
FIG. 4c is a diagram showing one part of the input portion of the switch matrix, which is further divided into a contact portion and a branch portion.
FIG. 4d is a diagram showing one part of the output portion of the switch matrix, which is further divided into an output control portion and a branch portion.

In FIG. 4a, it is shown that a relay ladder circuit, constituted by normally opened contacts $X_1$ through $X_{11}$ and output devices $Y_1$ and $Y_2$, is divided as shown by broken rows into matrix elements of four lines and six columns. FIG. 4b shows that the same relay ladder circuit is divided into an input portion and an output portion as indicated by broken lines. FIG. 4c shows that a part of nth column row included in the input portion of FIG. 4b is further divided into a contact portion and a branch portion as shown by broken lines. FIG. 4d shows that a part of the last column corresponding to the output portion in FIG. 4b is further divided into an output control portion and a branch portion.

Supposing that the input portion in FIG. 4b has m rows and n columns, the logic operation to be carried out for a contact $X_{m,n}$ in FIG. 4c included in the input portion shown in FIG. 4b will be either one of the following 5 patterns.

(1) Calculate a logic product between $X_{m,n}$ and the operation result for $X_{m,(n-1)}$, (2) Calculate a logic product of the negation of $X_{m,n}$ and the operation result for $X_{m,(n-1)}$, (3) Use the operation result for $X_{m,(n-1)}$ as it is (where $X_{m,n}$ is permanently ON), (4) The operation result for $X_{m,n}$ becomes OFF (where $X_{m,n}$ is permanently OFF), (5) Use any other operation result (according to the nature of $X_{m,n}$).

It should be noted that the logic operations for the contacts of the nth column are executed in either one of the above description patterns between the same contacts and the operation results for the contacts in the (n−1)th column, respectively.

Where the contacts in the nth column have no branch connections, the operation results for the same column are delivered toward the (n+1)th row. Conversely, where any one of the contacts in the nth column has branch connection to adjacent contact or contacts in the same column, a logic sum is obtained between the logic operation result for the specific contact and those of the adjacent contact or contacts, and the operation results for the specific contact is replaced by the logic sum. The above described operation is repeated for all contacts in the nth column and for all columns, until the logic operation for the entire input portion of the switch matrix is completed.

Before initiation of the logic operation for the same portion, the values of the m rows in the first column are all set at a logic "1".

The output portion of the switch matrix will now be described.

The operation of the output portion can be classified into the following seven patterns.

(1) Ordinary output (the results of the logic operations are delivered as the output of this portion).

(2) Timer output (timers are operated by the results of the logic operations).

(3) Counter output (counters are operated by the results of the logic operations).

(4) Latching output (latches are operated by the results of the logic operations).

(5) Unlatching output (unlatching operation is carried out by the results of the logic operations).

(6) Reset output (resetting operation is carried out based on the same results).

(7) Dummy output (the same results are delivered as dummy outputs).

The output portion is operated, after the completion of the logic operation for the input portion in accordance with the ON-OFF data delivered from the input portion and the operation pattern of the output portion.

When there are provided a plurality of relay ladder circuits, the operation of the sequence control apparatus is then transferred to another relay ladder circuit to be processed thereafter.

Figure 5A:
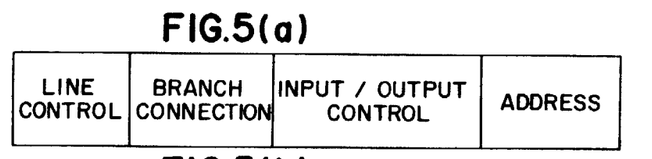
FIG. 5a is a diagram showing an ordinary construction of program instruction words required for carrying out the present invention.

An ordinary instruction word to be used in the present invention is indicated in FIG. 5a. Data to be contained in the instruction word for executing the operation of this invention are as follows.

(a) Locations of rows and columns of the switch matrix representing a relay ladder circuit,
(b) ON-OFF conditions of branching switches included in the switch matrix,
(c) Kinds of the input and output contacts included in the switch matrix, and
(d) Addresses of the same contacts.

In order to contain these data, the instruction word is divided into four parts as shown in FIG. 5a. The first part indicates the location of a switch in the two-dimensional switch matrix, the second part indicates ON-OFF condition of a branching switch, the third "input/output control part" indicates the kind of the input and the output, and the fourth "address part" indicates the addresses of the input and the output.

Figure 5B:
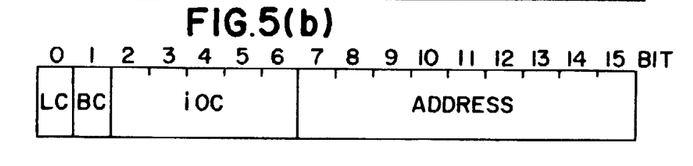
FIG. 5b shows an example wherein each of the instruction words is made up of 16 bits.

One example of the instruction word made up of 16 bits is shown in FIG. 5b. In this example, the position indicating part at the 0th bit, designated by LC (LINE CONTROL), indicates whether the contact is the last contact in a column or not. The second part at the first bit, designated by BC (BRANCH CONTROL) indicates whether the branching condition is ON (BC is "1") or OFF (BC is "0"). The third part extending from the 2nd bit to the sixth bit and designated by "iOC" stores i/O control data as shown in FIG. 6.

Figure 6:
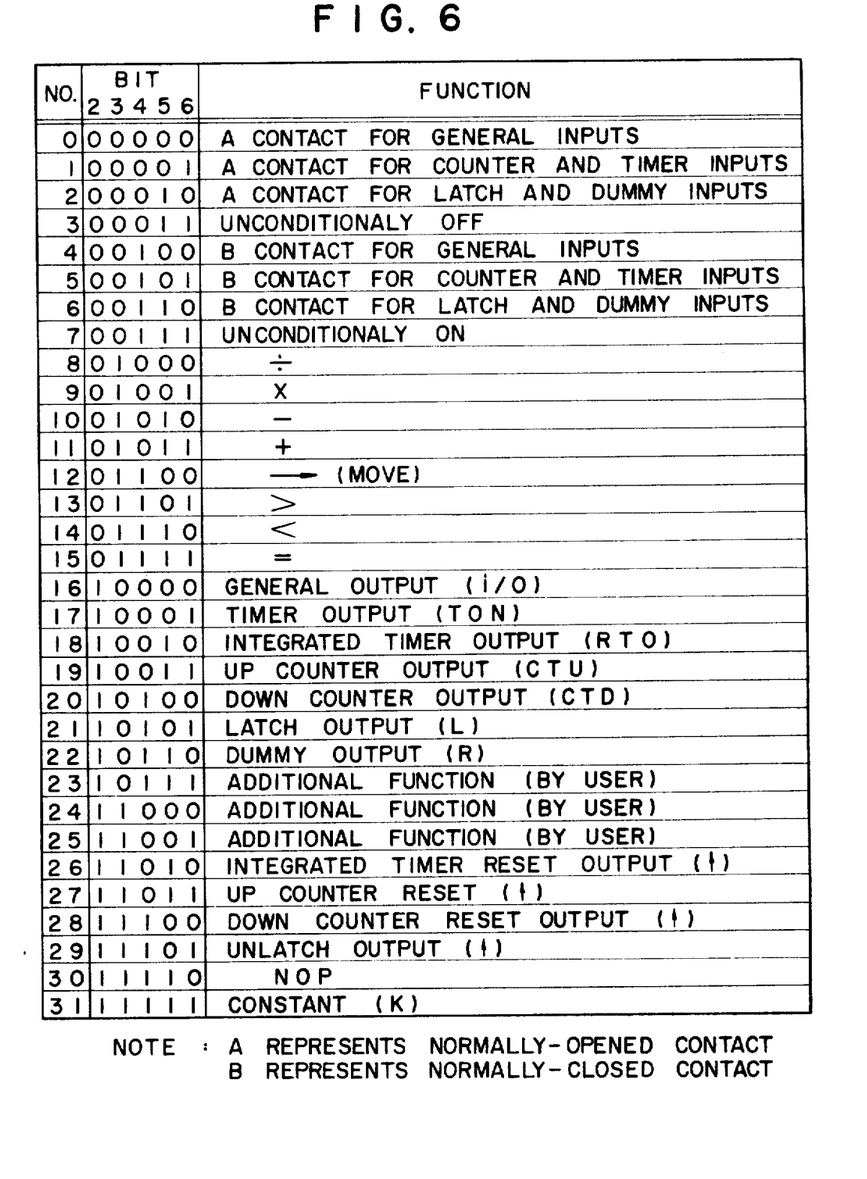
FIG. 6 is a table showing bit constructions and functions of various input/output control data.

In FIG. 6, control data of from No. 0 to No. 31 are indicated together with the 5 bits codes. Among the control data (or functions), those designated by symbols >, <, = at No. 13, 14 and 15 may be used as a control data for a contact such as X11 in FIG. 4b. For instance when > means $P_1 < P_2$, two instruction words as shown in FIG. 5b are prepared, the first word including the address of $P_1$ and the control data "01110" in "address" and "iOC" respectively, while the second word including the address of $P_2$ in "address" portion of the same word. In this case, the contents of "LC", "BC", and "iOC" in the second word are neglected when these words are processed in the apparatus. The four fundamental arithmetic operations and move operation shown from No. 8 to No. 12 in FIG. 6 may be used for the output portion of FIG. 4b. The instruction words for these operations are prepared as described above utilizing two words. The fourth part extending from the 7th bit to the 15th bit and designated by ADDRESS indicates the address (from 0 to 511) of the contact to which the instruction word is directed.

Figure 7:
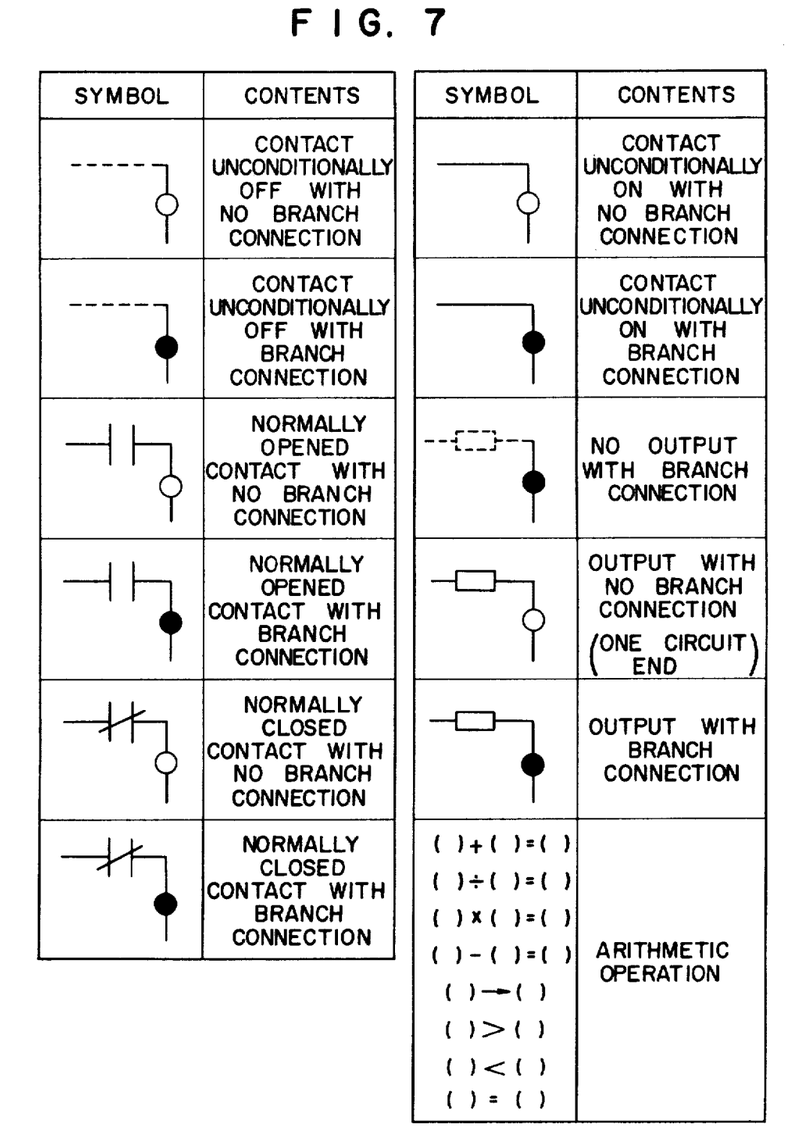
FIG. 7 shows various symbols for representing various instruction words.

FIG. 7 shows various symbols and the contents of the control data indicated by the symbols. These symbols are used for writing the control data in the instruction word in a simple manner.

Figure 8A:
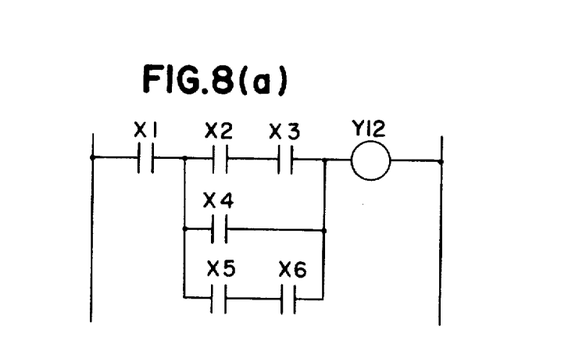
FIG. 8a illustrates another example of a relay ladder circuit.
Figure 8B:
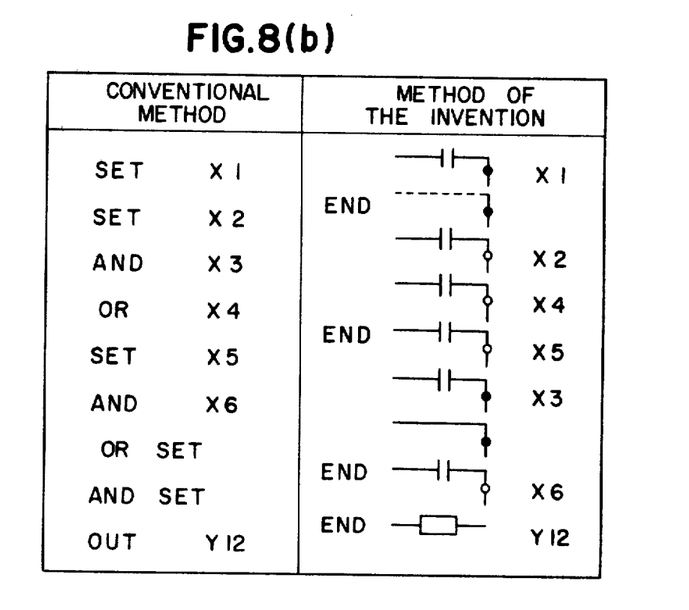

FIG. 8a indicates a relay ladder circuit, and FIG. 8b indicates how a program corresponding to the relay ladder circuit is prepared by the conventional method and by the present invention. The term END used herein shows that a column in the ladder circuit including the contact ends at that position. It is apparent from FIG. 8b that, according to the present invention, the programming of the relay ladder circuit shown in FIG. 8a can be carried out in a sequence inputting the first column starting from the first row to the last row, and then the second column starting from the first row to the last row, and then inputting the third column starting from the first row to the last row, and so on. Thus, the programming of the relay ladder circuit can be prepared utterly mechanically while observing the relay ladder circuit.

Figure 9:
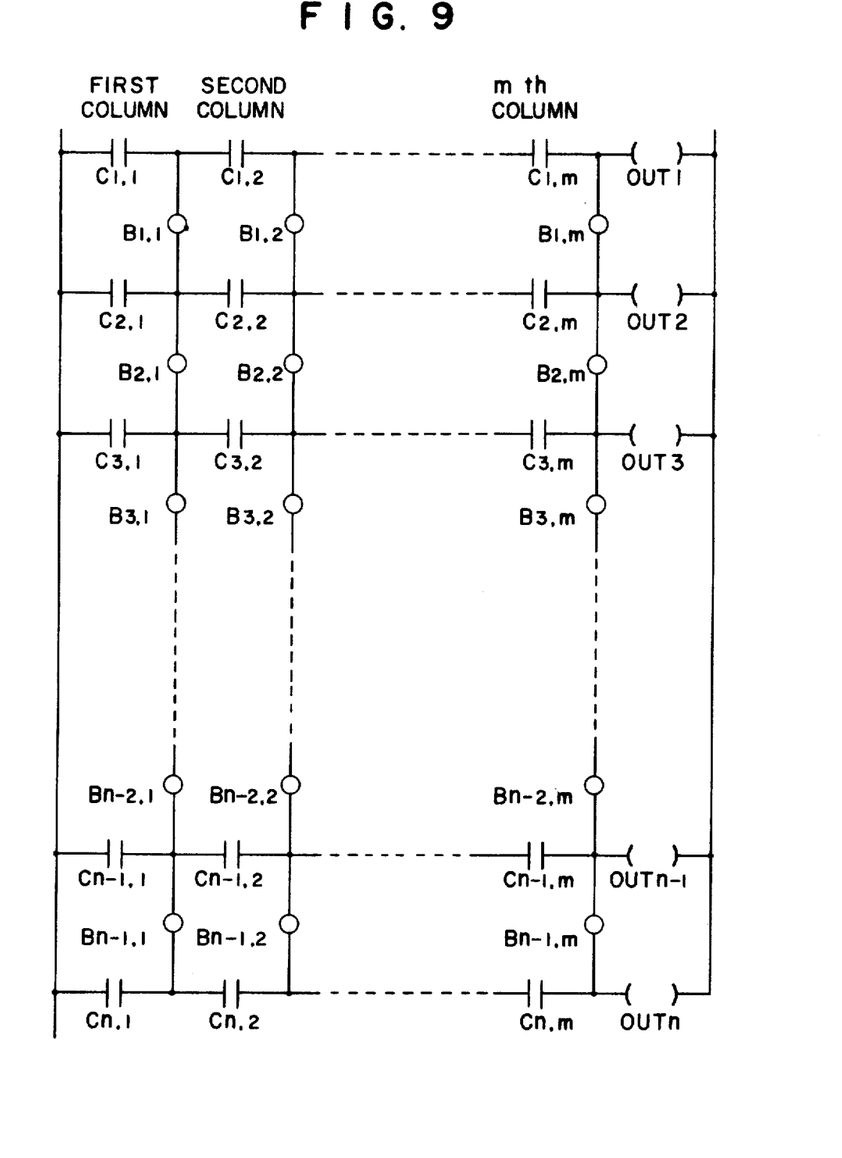
FIG. 9 is a diagram showing an ordinary relay ladder circuit wherein contact data and branch data are represented in a generallized form.

FIG. 9 shows an ordinary relay ladder circuit having n rows and m columns, wherein contact data and branch data are designated by $C_{ij}$ and $B_{ij}$ respectively ($i = 1, 2, \ldots n$; and $j = 1, 2, \ldots m$).

Figure 10:
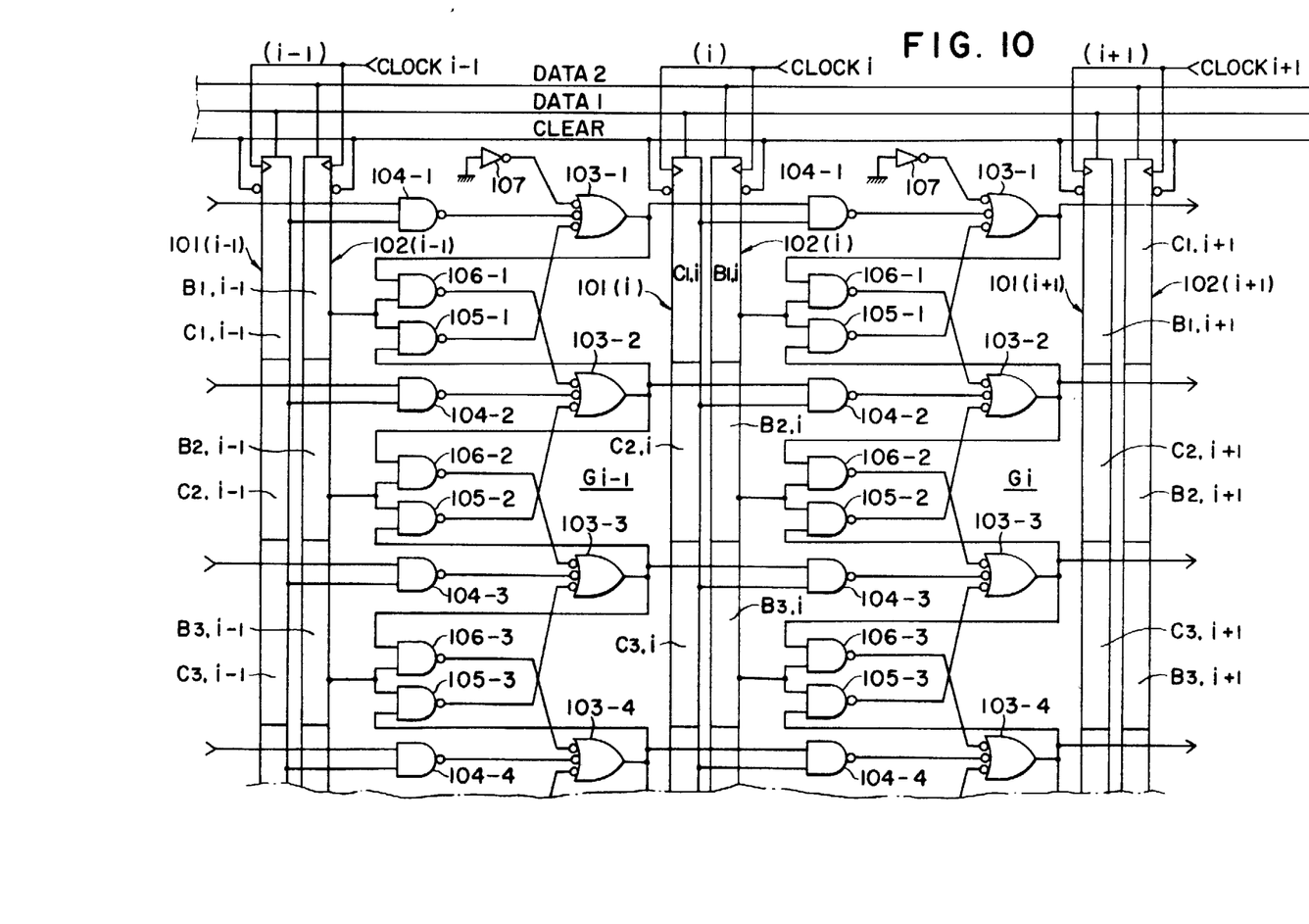
FIG. 10 is a circuit diagram showing a logic operation circuit of a sequence control apparatus according to the present invention.

FIG. 10 shows a preferred example of the logic operation circuit which is constructed as hardware. In this FIGURE only one part of the circuit to execute logic operations for three columns $i-1$, $i$ and $i+1$ is indicated.

In this part, there are provided shift registers $101(i-1)$ which receive contact data such as $C_{1(i-1)}$, $C_{2(i-1)}$, $C_{3(i-1)}$, ... $C_{n(i-1)}$ for a column $(i-1)$ of a switch matrix of n rows and m columns through an input line (DATA 1). More accurately, the contact data are received in the order of $C_{n(i-1)}$, $C_{(n-1)(i-1)}$, ..., $C_{3(i-1)}$, $C_{n(i-1)}$, and $C_{1(i-1)}$. Another group of shift registers 102 are also provided for receiving the branch data which are introduced thereto through an input row (DATA 2) in the order of $B_{n(i-1)}$, $B_{(n-1)(i-1)}$, ..., $B_{3(i-1)}$, $B_{2(i-1)}$, and $B_{1(i-1)}$. The aforementioned contact data and branch data are received for instance in the shift registers $101(i-1)$ and $102(i-1)$ by the timing action of a clock pulse CLOCK$(i-1)$. After all the contact data and branch data for a column $i-1$ have been received in the shift registers $101(i-1)$ and $102(i-1)$, respectively, logic operations are executed on these data in a part $G(i-1)$ of a gate circuit G. Since the parts $G(i-1)$, $G(i)$, and $G(i+1)$ (not shown) of the gate circuit G connected to the shift register $101(i-1)$, $102(i-1)$; $101(i)$, $102(i)$; $101(i+1)$, $102(i+1)$ have the same construction, the gate circuit G will be described with respect only to the gate part $G(i-1)$.

In the part $G(i-1)$ of the gate circuit, NOR gate circuits 103-1, 103-2, 103-3, ..., 103-n are provided for the lines 1—n in the column $(i-1)$ of the switch matrix. The outputs of NAND gate circuits 104-1, 104-2, 104-3, 104-4 receiving the contact data for the corresponding line in the column $(i-1)$ and the operational results for the same line in the previous column $(i-2)$ are supplied to one input of the NOR gates 103-1, 103-2, 103-3. Furthermore, the outputs of NAND gate circuits 105-1, 105-2, 105-3, :... receiving the branch data for the corresponding line in the column $(i-1)$ and the output of a NOR gate circuit for the next line in the same column $(i-1)$ are connected to another input of the NOR gate circuits 103-1, 103-2, 103-3. Likewise the outputs of NAND gate circuits, 106-1, 106-2, 106-3, ..., receiving the branch data for the preceding line and the output of a NOR gate circuit for the preceding line are applied to still another input of the NOR gate 103-1, 103-2, .... Herein, for the NOR gate circuit 103-1, a NAND gate circuit (for instance 106-0) receiving the branch data and the output of a NOR gate circuit for the preceding line is not provided, and an inverter 107 is connected instead of the NAND gate circuit.

All elements included in the gate part Gi, which are similar to those in the gate part $G(i-1)$ are designated by like reference numerals. Thus, the output of a NAND gate circuit provided for a row in each of the gate parts such as $G(i-1)$, $G(i)$ and $G(i+1)$ represents the results of the logic operation utilizing the contact data and the branch data, and this output is utilized as a logic input for the logic operation for the corresponding row in the subsequent column (applied to an input terminal of the NAND gate circuits 104-1, 104-2, ... as described hereinbefore).

A unique feature of the above described example of the logic operation circuit lies in that the contact data and branch data for all columns of a switch matrix are sequentially applied to the corresponding pairs of the shift registers such as 101(i−1), 102(i−1); 101(i), 102(i); 101(i+1), 102(i+1); ... in accordance with a CLOCK signal, and the results of the logic operation are used for the logic operation of the subsequent column.

Figure 11:
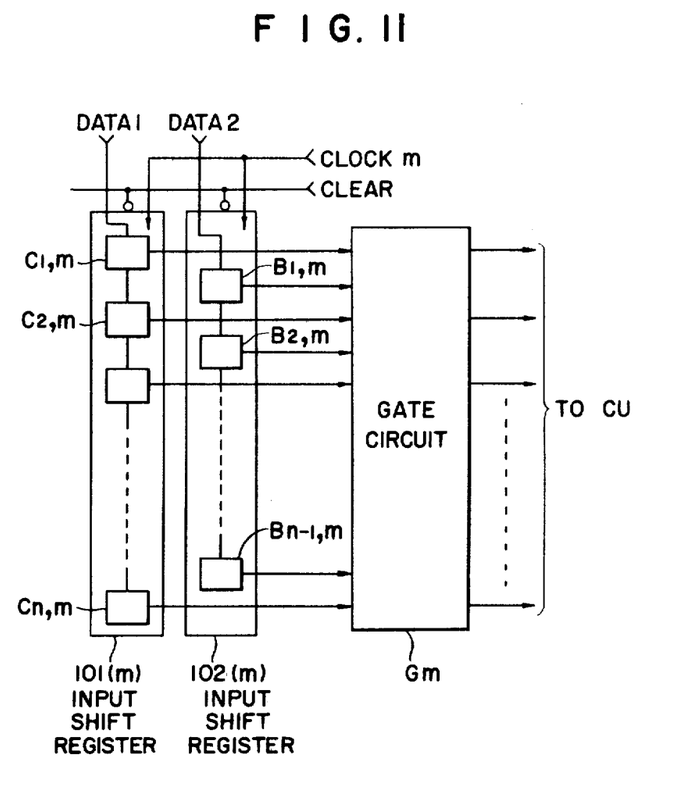
FIG. 11 is a block diagram showing the logic operation circuit in a more simplified form.

FIG. 11 is a block diagram showing a part corresponding to the mth (last) column, and the output part of the logic operation circuit shown in FIG. 10. The part corresponding to the mth column of the logic operation circuit includes the shift registers 101(m) and 102(m). The contact data $C_{n,m}$, $C_{(n-1),m}$, ..., $C_{2,m}$, and $C_{1,m}$ and the branch data $B_{(n-1),m}$, $B_{(n-2),m}$ ..., $B_{2,m}$, $B_{1,m}$ are applied through input lines DATA 1 and DATA 2 to the input registers 101(m) and 102(m), respectively, by the timing action of a clock pulse CLOCK m.

The part corresponding to the mth column further includes a gate part G(m) of a construction similar to the gate parts G(i−1), G(i) and G(i+1). The output part shown in FIG. 11 comprises an output shift register 107 the operation of which can be transferred between latch mode and shift mode. When the shift register 107 is operated in the latch mode (SHIFT=0), the output from the gate part G(m), which correspond to the outputs of the NAND gate circuits in FIG. 10, are latched in the register 107. A clock pulse CLOCK L is an original signal for producing clock pulses CLOCK(i−1), CLOCK(i), CLOCK(i+1) which govern the timing of inputting the contwact data and the branch data in the input registers 101 and 102 of various columns.

The inputs, to be given from the previous column, of the NAND gate circuits 104-1, 104-2, ..., 104-n in the first column in FIG. 10 (where i=2) must be at a logic "1".

Figure 12:
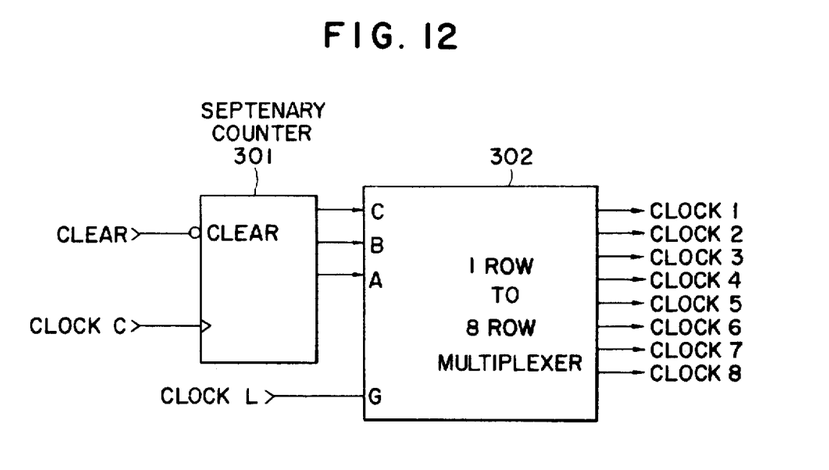
FIG. 12 is a block diagram showing a circuit for providing various clock signals.

FIG. 12 is a block diagram showing a circuit for providing clock pulses CLOCK(i−1), CLOCK(i), CLOCK(i+1) shown in FIG. 10. In the example shown, the circuit is illustrated to provide eight clock pulses CLOCKi ($i_{max}$=8). The circuit comprises a septenary counter 301 (for selecting columns and a demultiplexer 302. The signal CLEAR and a clock pulse CLOCK C to be counted are applied to the septenary counter 301 for delivering three outputs to the input terminals A, B, and C of the demultiplexer 302, respectively. When seven clock pulses CLOCK C are applied to the counter 301, the conditions of the input terminals A, B and C are returned to the original state (A=0, B=0, and C=0). In this manner, any one of numbers 0 through 7 defining the clock pulses CLOCKi can be represented by a bit combination of the inputs A, B and C.

The clock pulses CLOCK L applied to the demultiplexer 302 is delivered from output terminals CLOCK 1 through CLOCK 8 of the multiplexer 302 in accordance with the bit combination of the inputs A, B and C. It should be noted that where the number of lines in each column of the switch matrix is n, clock pulses L of a number n are delivered from each of the output terminals CLOCK 1 through CLOCK 8 of the demultiplexer 302.

Figure 13:
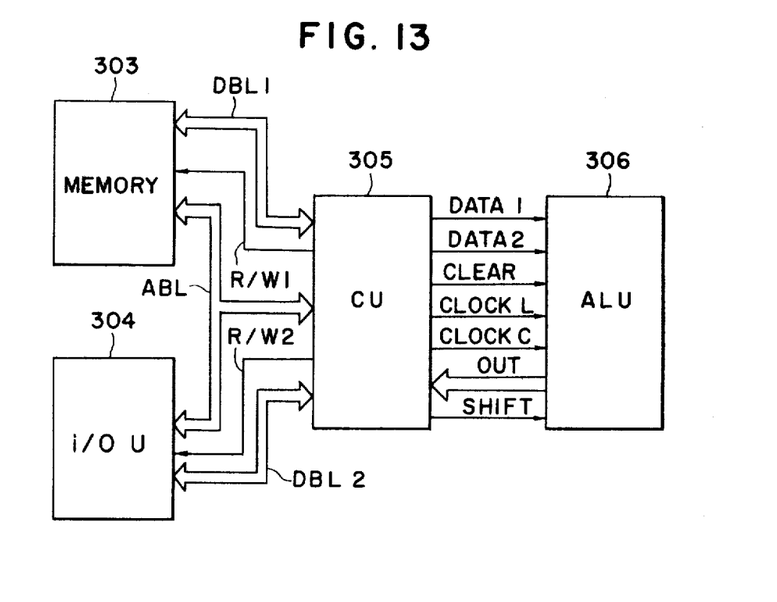
FIG. 13 is a block diagram showing entire operations of the sequence control apparatus.

FIG. 13 shows the entire construction of the sequence control apparatus of this invention in the form of a block diagram. The apparatus comprises a program memory device 303, an input/output device 304, a control device 305, and an arithmetic logic device 306. The program memory device 303 stores sequence programs, while the input/output device 304 is connected to various input/output elements such as sensors, output coils and the like. Each of the input/output elements is assigned with an address so that these elements can be designated by selecting these addresses. In the input/output device 304, there is provided a memory area for storing the addresses and the logic conditions or the like of the input/output elements which are periodically assigned.

The control device 305 controls the operation of the entire sequence control apparatus of this invention, and also is capable of altering the sequence programs and monitoring the operation.

The arithmetic and logic operational device (ALU) 306 executes logic operations as described with reference to FIG. 10. The device 306 further includes a circuit for producing clock pulses as shown in FIG. 12.

Control signals such as CLEAR, CLOCK L, CLOCK C, and SHIFT are supplied from the control device 305 to the arithmetic logic operational device (hereinafter termed ALU) 306. Contact data DATA 1 and branch data DATA 2 are supplied from the input/output device 304 and program memory device 303 to the CU via bus lines $DBL_1$ and $DBL_2$ and then selectively applied to the ALU 306. R/W 1 and R/W 2 designate Read/Write signals, and weather the signals are used for reading or writing is instructed by the control device 305.

The operation of the sequence control apparatus shown in FIG. 13 will now be described.

At first, the control device 305 delivers a reading signal R/W 1 to the program memory device 303. Then, the device 303 sends out the data words through a data bus line $DBL_1$ to the control device (hereinafter termed CU) 305. CU 305 interprets the data, and when the data are instruction words for the ladder operation, transformes the signal R/W 2 into a read state and sends the address assigned in the instruction word through an address bus ABL to the input/output device 304. The CU 305 further sends the contact data DATA 1 and branch data DATA 2 temporarily stored in CU 305 to ALU 306 in synchronism with the clock pulse CLOCK L. The operations executed thereafter in ALU 306 are the same as that described hereinbefore.

In a case where the instruction word read out from the memory device 303 is a general output instruction (such as exciting output for a relay coil), the operation result of ALU 305 is temporarily stored in CU 306 by signals such as SHIFT, CLOCK, ADDRESS, R/W 2, and then delivered to the input/output device 304. However, in a case where the instruction word indicates an operation of, for instance, a timer, counter, latch, dummy, reset, or an arithmetic operation, a processing is executed in CU 305 for the signal, and the result of the processing is set in a memory device.

In still another case where a timer, counter, dummy, or latch is included in the ladder circuit, CU 305 sends the data to ALU 306 in consideration of the contents of the memory device.

In the foregoing description, although it was assumed that a memory area is provided in the input/output device 304 for storing the contact data DATA 1 and the like, the memory device 303 may also be constructed such that it includes not only the above described area for storing programs for the sequence operation of the apparatus, but also a temporary memory area for storing the contact data and the like. The temporary memory area provided in the memory device 303 can be used for temporarily storing the operational results executed in CU 305.

Figure 14:
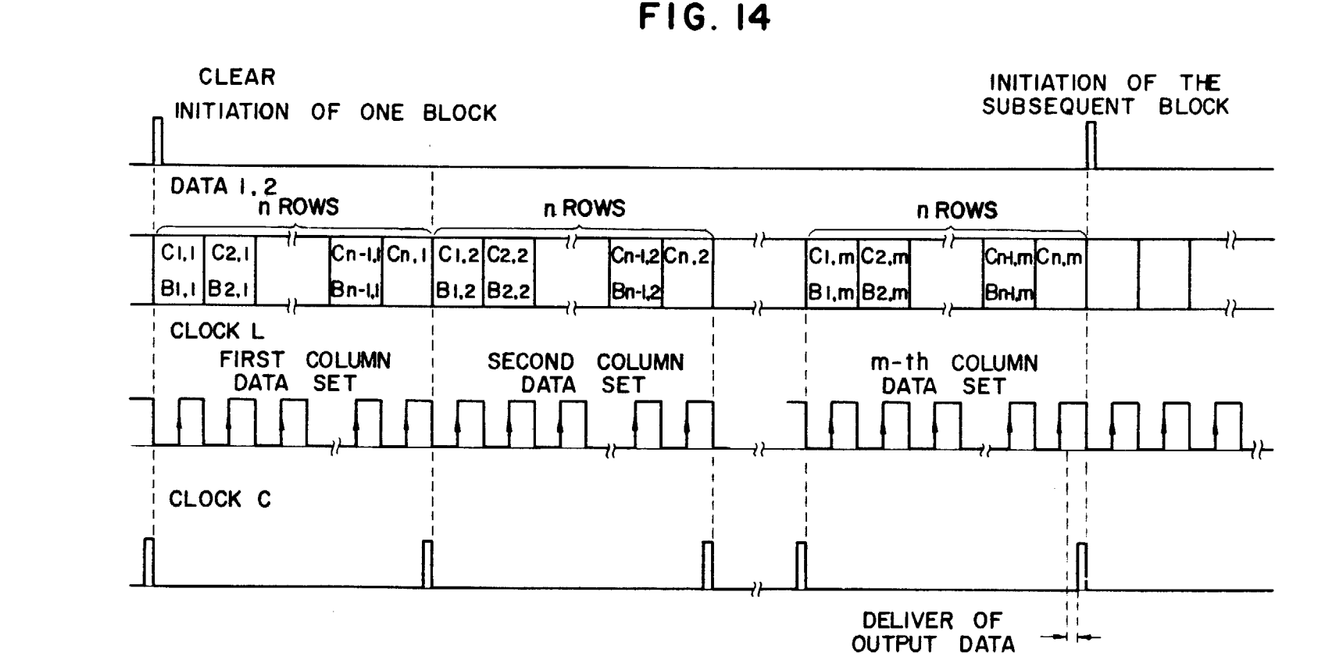
FIG. 14 is a timing chart of various signals obtained in the logic operation circuit.

FIG. 14 shows a timing chart for explaining the logic operation executed in ALU 306, or more particularly, in the logic operation circuit of FIG. 10, on a relay ladder circuit as shown in FIG. 9. In this timing chart, a CLEAR pulse shown at an upper part of FIG. 14 indicates the initiating instant of the logic operation. By this CLEAR pulse, the contents of the registers and the counter are reset to "0".

The clock C shown in the lowermost part of FIG. 14, which has been applied to an input of the septenary counter 301, initiates logic operations for the succeeding columns. The operation for the rows in each column is started by CLOCK L. It is also shown that the DATA 1, that is $C_{ij}$, and DATA 2, that is $B_{ij}$, are successively set in the shift register at the rising instants of the pulse CLOCK L.

When the contact data $C_{im}$ and the branch data $B_{im}$ of the last (mth) column are set in the corresponding input registers 101(m) and 102(m) as shown in FIG. 11, respectively, an output corresponding to the resultant condition of the relay ladder circuit determined by the ON-OFF states of the contacts can be obtained in the output line.

In the sequence control apparatus of the present invention, since the logic operation circuit corresponding to the input portion of a relay ladder circuit as shown in FIG. 4b is constituted by shift register and simple gate circuits arranged with respect to the columns of the relay ladder circuit, logic operation circuit can be constructed easily even where the numbers of rows and columns of the ladder circuit are increased to any desired values. Furthermore, it will be apparent to those skilled in the art that the entire shift registers and gate circuits comprising NAND gate circuits can be constructed as a single chip of a LSI.

What is claimed is:

1. In a programmable sequence control apparatus comprising:

a first memory for storing a plurality of sequence program instructions, a relay ladder operation unit for executing logic operation simulating an real relay ladder circuit having n rows and m columns (n and m are positive integers), an input/output control unit which is connected with input and output elements for introducing input data representing logical states of the input elements and delivering output data representing logical states of the output elements, said input data being used in said ladder operation unit as a contact data, and a control unit responsive to said each program instruction for delivering control signals to said relay ladder operation unit, the improvement wherein said input/output control unit has a second memory for storing said input and outut data, each of the addresses in said second memory being related to a position in said relay ladder circuit defined by a pair of column's and row's members;

each of said program instruction in the first memory includes information concerning said position, which includes addresses corresponding to said input or output elements, a branch data representing whether one row corresponding to an address in a column is connected directly with one directly below in the subsequent column or not, and a line data representing whether the row in said column is the last (or bottom) one or not;

said relay ladder operation unit has a plurality of logic circuits equal to the number of columns in the relay ladder circuit, each of said logic circuits comprising:

a first shift register for storing said contact data, a second shift register for storing said branch data and a gate circuit which receives said contact and branch data being stored in said shift registers for producing a plurality of signals, each of signals representing logical state of each row in one column, and a memory for storing output data which is formed when all of contact and branch data in one sequence cycle are registered in said first and second shift registers, said control unit firstly decodes said program instructions consecutively and supplies decoded branch data and the corresponding contact data fetched out of said second memory to said logic circuits, and simulation of said relay ladder circuit in one sequence cycle terminates when said control unit decodes all program instructions, and all of the contact and branch data corresponding to said each position in the ladder circuit are registered in said shift registers.

* * * * *